United States Patent [19]

Maeda et al.

[11] Patent Number: 4,967,025
[45] Date of Patent: Oct. 30, 1990

[54] PURIFICATION METHOD OF CARBON FLUORIDES

[75] Inventors: Tadayuki Maeda, Ibaraki; Satoshi Koyama, Osaka; Kazuo Okamura, Itami, all of Japan

[73] Assignee: Daikin Industries, Ltd., Osaka, Japan

[21] Appl. No.: 377,977

[22] Filed: Jul. 11, 1989

[30] Foreign Application Priority Data

Jul. 11, 1988 [JP] Japan ................................ 63-172389

[51] Int. Cl.$^5$ ............................................. C07C 17/38
[52] U.S. Cl. ..................................... 570/177; 570/150
[58] Field of Search ................................ 570/150, 177

[56] References Cited

U.S. PATENT DOCUMENTS

| 3,929,918 | 12/1975 | Meshri et al. | 570/150 |
| 3,929,920 | 12/1975 | Komo et al. | 570/150 |
| 4,243,615 | 1/1981 | Watanabe et al. | 570/150 |
| 4,423,261 | 12/1983 | Watanabe et al. | 570/150 |

FOREIGN PATENT DOCUMENTS 56-36790 8/1981 Japan.
63-13930 3/1988 Japan.

*Primary Examiner*—Alan Siegel
*Attorney, Agent, or Firm*—Armstrong, Nikaido, Marmelstein, Kubovcik & Murray

[57] ABSTRACT

A purification method of carbon fluorides by removing non-bonding fluorine from carbon fluorides. The removing treatment is carried out by contacting gases with the non-bonding fluorine. Such gases are HCl, $SO_2$, $NO_2$, $H_2$, steam and a mixed gas thereof.

4 Claims, 2 Drawing Sheets

PURIFICATION METHOD OF CARBON FLUORIDES

BACKGROUND OF THE INVENTION

The present invention relates to a method for purifying carbon fluorides, particularly to a method for removing a non-bonding fluorine which are remaining in carbon fluorides or regulating an amount thereof.

Hitherto, carbon fluorides are widely used as active materials for batteries by utilizing their electrochemical properties, or as solid lubricants by utilizing their excellent lubricity, or also as water and oil repellents. The carbon fluorides are prepared by reacting carbon materials such as natural or artificial graphites with fluorine gas. It is known that the carbon fluorides can have two chemical structures, i.e. $(CF)_n$ and $(C_2F)_n$, depending with starting materials or preparation conditions. Also, it is known that unreacted fluorine which does not bond to a carbon atom is present in the resulting carbon fluorides and, that the unreacted fluorine gives various affects.

For example, when carbon fluorides containing a large amount of this non-bonding fluoride are used as active materials for batteries, the non-bonding fluorine causes a Li surface of collector to corrode and increases an internal resistance, which results in lowering of battery characteristics. In addition, an initial discharge voltage sometimes rises to which is a high voltage, e.g. 7.0 V, to give damage to IC circuits and the like.

Accordingly, it is said that the non-bonding fluorine in carbon fluorides should be removed therefrom. As used for active materials for batteries, however, too small amount of the non-bonding fluorine is not desirable, because a discharge voltage, particularly an initial discharge voltage becomes lowered. Therefore, a purification method by which an amount of the non-bonding fluorine in carbon fluorides can be controlled is desired, but prior purification methods are not necessarily satisfactory.

For example, Japanese Tokkyo Kokoku No. 36790/1981 discloses a treating method with mixed solutions of alcohols and strong acids or strong alkalis. The treating method has problems that strong reagents such as strong acids or strong alkalis are used, that post steps such as water linsing, filtration and drying are required after the treatment, and that an amount of the remaining non-bonding fluorine is difficult to control.

Japanese Tokkyo Kokoku No. 13930/1988 discloses a treating method with ammonia gas. The method, however, has a high danger due to the use of combustible ammonia gas. Moreover, $NH_4F$ produced by the reaction happens to be contained in the treated carbon fluorides as a contaminant. In order to remove $NH_4F$, a post treatment in which $NH_4F$ is sublimated is required. As mentioned above, this method has problems to be improved.

The present invention relates to a safe and easy purification method by which a delicate control can be achieved.

SUMMARY OF THE INVENTION

According to the present invention, there can be provided a purification method in which carbon fluorides are subjected to contact treatment with gaseous materials which is a gas selected from the group consisting of hydrochloride gas, sulfur dioxide gas, nitrogen dioxide gas, hydrogen gas, steam and a mixed gas thereof.

DETAILED DESCRIPTION OF THE INVENTION

Figure 1:
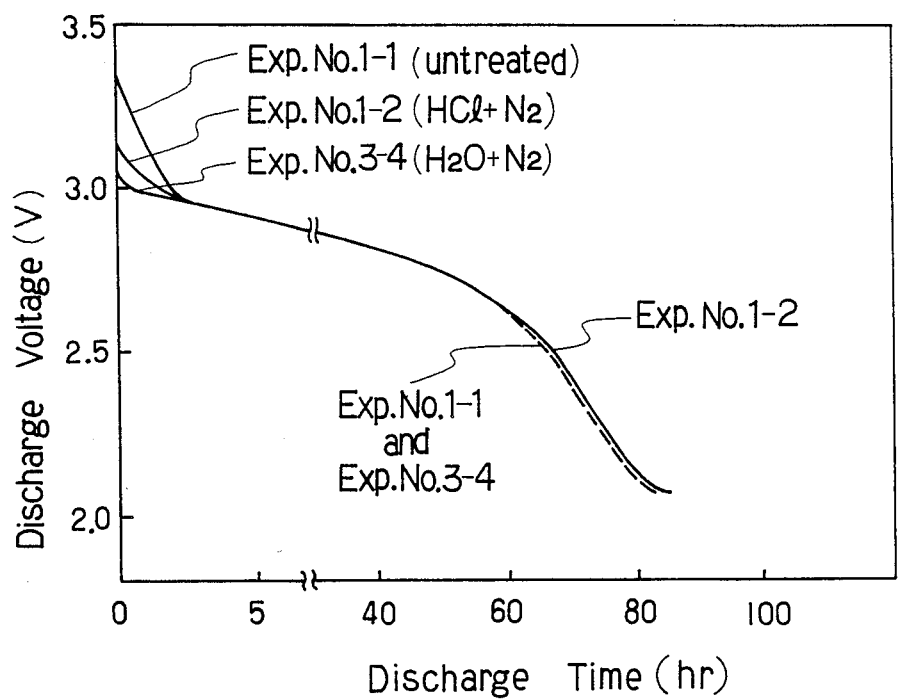
FIGS. 1 and 2 show graphs of characteristics of discharge voltages of the batteries fabricated in Example 4.

The particular gases used in the present invention can react with the non-bonding fluorine to produce gaseous fluorides. Preferred examples are hydrochloride gas, sulfur dioxide gas, nitrogen dioxide gas, hydrogen gas, steam, or a mixed gas thereof. These gases react with the non-bonding fluorine according to the following schemes.

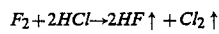

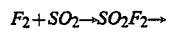

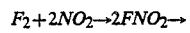

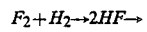

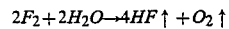

$$F_2 + 2HCl \rightarrow 2HF\uparrow + Cl_2\uparrow$$

$$F_2 + SO_2 \rightarrow SO_2F_2 \rightarrow$$

$$F_2 + 2NO_2 \rightarrow 2FNO_2 \rightarrow$$

$$F_2 + H_2 \rightarrow 2HF \rightarrow$$

$$2F_2 + 2H_2O \rightarrow 4HF\uparrow + O_2\uparrow$$

The reaction products are all gases which can easily be removed from the carbon fluorides. Particularly, the gases of HCl, $NO_2$, $SO_2$ and steam are incombustible or hard to burn, and thus can be handled in safety.

The particular gases are preferably used in a range from the same molar amount to three times larger than that of the non-bonding fluorine to be removed. The reaction can be conducted below a decomposition temperature of the carbon fluoride (about 350° C.), and preferably at a relatively low temperature range from room temperature to 100° C. The treating time is not particularly limited and varies depending with a kind of carbon fluorides, an amount of non-bonding fluorine to be removed, a treating temperature, or a gas concentration when using a diluent gas. The treating time may be generally five minutes to ten hours, preferably 30 minutes to five hours, whereby a desired non-bonding fluorine content can be achieved.

The particular gases in the invention may be used at pure state, or may be diluted with inert gases. The inert gases used as carrier gases are gases which do not react with fluorine, and may be, for instance, helium gas, argon gas, nitrogen gas, or air. The concentration of the particular gas may be 1 to 50 % by volume, preferably 3 to 30 % by volume.

The reaction treatment can be carried out by contacting the particular gases with the carbon fluorides, preferably by passing the gass therethrough. As a reactor, a solid-gas catalytic reactor can be employed. The reactor may be a stationary type or a fluidized type, and is preferably made of monel which is resistant to fluorine and hydrogen fluoride.

After contacting the particular gas to react with the non-bonding fluorine, the resulting reaction products (gas) remained in the carbon fluoride can be easily removed by passing an inert gas and drying, if necessary. The inert gases are the gases used as the carrier gases, and the drying may be carried out at a temperature of not more than 150° C. for five hours, generally for about one hour.

According to the purification method of the present invention, the control of non-bonding fluorine content can be achieved very easily. Namely, an amount of non-bonding fluoride to be removed is previously calculated by subtracting the desired amount from the initial amount in the carbon fluoride, and then the particular gas is passed in the same molar amount as the calculated amount of non-bonding fluoride to be removed. When a concentration of the particular reacting gas is regulated in response to the amount to be removed, more delicate control can be achieved. Generally when a treating time becomes shorter, a treating temperature should be raised or a concentration of the particular reacting gas should be increased. In view of efficiency, it had better to raise a treating temperature.

Also, since sampling of the carbon fluoride to be treated is easy, the removed amount of non-bonding fluoride can be easily monitored. Accordingly, by referring the sampling date to a concentration of the reacting gas or a treating time, more precise control of a non-bonding fluoride content can be effected.

The control of concentration of the reacting gas can be easily carried out by supplying the reacting gas from separate sources while the inert gas and regulating the flow rates of both gases with flow meters.

The purification method of the present invention is explained by Examples. It should be understood that the present invention is not limited to the Examples.

non-bonding fluorine content is calculated according to the following equation.

$$\frac{\text{Titre(ml)} \times \text{Normal(N)} \times 5 \times 19}{1000} \times 100 =$$

Non-bonding fluorine content (%)

TABLE 1

| Experimental No. | Carbon fluoride | Reacting gas | Inert gas | Conc. of reacting gas (vol. %) | Treating temp. | Treated carbon fluoride ||| 
|---|---|---|---|---|---|---|---|---|
| | | | | | | $F_2$ cont. (wt %) | Non-bonding $F_2$ cont. (wt %) | Amount of decrease (wt %) |
| 1-1 | $(C_2F)_n$ | — | — | — | — | 48.6 | 1.17 | — |
| 1-2 | $(C_2F)_n$ | HCl | $N_2$ | 10 | room temp. | 47.9 | 0.47 | 0.70 |
| 1-3 | $(C_2F)_n$ | $SO_2$ | $N_2$ | 10 | room temp. | 48.1 | 0.51 | 0.66 |
| 1-4 | $(C_2F)_n$ | $NO_2$ | $N_2$ | 10 | room temp. | 48.0 | 0.50 | 0.67 |
| 1-5 | $(C_2F)_n$ | $H_2O$ | $N_2$ | 90% RH* | 100° C. | 48.4 | 0.98 | 0.19 |
| 1-6 | $(C_2F)_n$ | $H_2O$ | dry air | 50% RH** | room temp. | 48.6 | 1.12 | 0.05 |
| 1-7 | $(CF)_n$ | — | — | — | — | 62.0 | 0.010 | — |
| 1-8 | $(CF)_n$ | HCl | $N_2$ | 10 | room temp. | 62.0 | 0.001 | 0.009 |

*Measured at 60° C.
**Measured at room temperature.

EXAMPLE 1

A tube of monel with disterbing plates was charged with 100 g of a carbon fluoride, and the gas shown in Table 1 was passed therethrough for two hours (flow rate: 500 cc/min). The carbon fluoride used was a carbon fluoride $(C_2F)_n$ made from an artificial graphite, and had a fluorine content of 48.6 % by weight and a non-bonding fluorine content of 1.17 % by weight.

After the contact treatment, the carbon fluoride was dried by passing nitrogen gas through the carbon fluoride at a rate of 1l/min for one hour with heating at 100° C. A non-bonding fluorine content of the treated carbon fluoride and the amount of decrease of the non-bonding fluorine are shown in Table 1.

An amount of non-bonding fluorine was measured by the following iodo metry. (Iodo metry)

A measuring flask of 50 ml is charged with about 500 mg of a carbon fluoride, and thereto 15 ml of ethanol is added. After shaking for five minutes, 20 ml of 0.5N-KI solution is added and shaked well again for five minutes, and then allowed to stand for 20 minutes. A demineralized water is added to make a total volume of 50 ml. After shaking well, the solution is filtrated with a 5C filter paper, and the filtrate is shaking well, and then 10 ml of the filtrate is pored to a 50 ml beaker. This filtrate is titrated with a N/100 hypo (when a non-bonding fluorine content is very little, a N/1000 hypo is used). A

EXAMPLE 2

A carbon fluoride $(C_2F)_n$ ($F_2$ content: 48.6 %, non-bonding $F_2$ content: 1.17 %) was treated in the same procedures as in Experimental No. 1-5 of Example 1 except that a steam concentration of the $N_2$-steam mixed gas system of Experimental No. 1-5 of Example 1 was changed as in Table 2. The mixed gas was passed at 500 cc/min for two hours at 100° C. The results are shown in Table 2.

TABLE 2

| | | Treated carbon fluoride ||
|---|---|---|---|
| Experimental No. | Steam conc. (RH at 60° C.) | Non-bonding $F_2$ cont. (wt %) | Amount of decrease (wt %) |
| 2-1 | 20% | 1.05 | 0.12 |
| 2-2 | 50% | 1.02 | 0.15 |
| 2-3 | 90% | 0.98 | 0.19 |
| 2-4 | dry air | 1.15 | 0.02 |

EXAMPLE 3

In the treating system of Experimental No. 1-6 of Example 1, an amount of decrease (removed) of non-bonding $F_2$ was measured by raising a treating temperature as in Table 3. The conditions other than the treating temperature were the same as those in Experimental No. 1-6.

The results are shown in Table 3.

TABLE 3

| | | Treated carbon fluoride ||
|---|---|---|---|
| Experimental No. | Treating temp. (°C.) | Non-bonding $F_2$ cont. (wt %) | Amount of decrease (wt %) |
| 3-1 | room temp. | 1.12 | 0.05 |
| 3-2 | 60° C. | 1.10 | 0.07 |
| 3-3 | 100° C. | 1.00 | 0.17 |
| 3-4 | 150° C. | 0.88 | 0.29 |

EXAMPLE 4

A battery was fabricated by using, as an active material, the carbon fluoride prepared in Experimental No. 1-1, No. 1-2, No. 1-3, No. 1-4 or No. 3-4 (each $(C_2F)_n$), or in Experimental No. 1-7 or No. 1-8 (each $(CF)_n$). A discharge voltage and discharge time were measured with respect to the just fabricated battery and the battery after storing for one year at 45° C.

The fabrication and the measurement were done by the following manner.

the carbon fluorides of Experimental No. 1-7 and No. 1-8 (each $(CF)_n$), discharge voltage change was measured with lapse of time. The results are shown in FIG. 1 $((C_2F)_n)$ and FIG. 2 $((CF)_n)$

TABLE 4

| Carbon fluoride | Initial | | Stored for one year at 45° C. | |
|---|---|---|---|---|
| | Intermediate voltage (V) | Discharge time (hr) | Intermediate voltage (V) | Discharge time (hr) |
| Experimental No. 1-1 (Untreated $(C_2F)_n$) | 2.85 | 66.8 | 2.78 | 65.5 |
| Experimental No. 1-2 | 2.86 | 67.0 | 2.83 | 66.8 |
| Experimental No. 1-3 | 2.85 | 66.7 | 2.81 | 66.5 |
| Experimental No. 1-4 | 2.85 | 66.7 | 2.82 | 66.5 |
| Experimental No. 3-4 | 2.86 | 66.8 | 2.82 | 66.5 |
| Experimental No. 1-7 (Untreated $(CF)_n$) | 2.65 | 108.4 | 2.63 | 106.3 |
| Experimental No. 1-8 | 2.65 | 108.4 | 2.63 | 108.0 |

The positive electrode was prepared by admixing well the carbon fluoride ($(C_2F)_n$ or $(CF)_n$), acetylene black as an electric conductor and Polyflon ® fine powder (PTFE powder available from Daikin Industries, Ltd.) as a binder (10:1:3) by a homogenizer, compressing about 40 mg of the admixture under a pressure of 200 kg/cm$^2$ to give a disc having a diameter of 10 mm. A nickel net (12 mm × 112 mm) was interposed between two discs, and then compressed under a pressure of about 10 kg/cm$^2$. After that, the product was dried under a reduced pressure, and then weighed and kept in a dry box.

A negative electrode was prepared by cutting a lithium plate (10 mm × 10 mm × 1 mm) out of a lithium block, and held on a nickel net. The negative electrodes were positioned on both sides of the positive electrode.

An electrolyte was prepared by distilling a commercially available γ-butyrolactone under a reduced pressure of about 20 mm Hg, and drying with a molecular sieve 4A. Lithium borofluoride was used by drying a commercially available lithium borofluoride under vacuum at about 120° C., in a rotary evaporator. A 1N battery electrolyte was prepared in a dry box and kept therein as it was.

A battery was fabricated by setting each electrode in a test cell and pouring the battery electrolyte thereto. After allowing to stand for day and night, discharge test was begun at 25° C. with a discharge resistor of 10 kΩ. All the data were calculated per 50 mg of the active material (only $(C_2F)_n$). The discharge time shown in Table 4 represents a discharge time until a discharge voltage goes down to 2.5 V. The results are shown in Table 4.

Also, with respect to the batteries just after the fabrication using the carbon fluorides of Experimental No. 1-1, No. 1-2 and No. 3-4 (each $(C_2F)_n$) and with respect to the batteries stored for one year at 45° C. using As is clear from FIG. 1 and Table 4, according to the method of the present invention, an initial discharge voltage of the battery using the $(C_2F)_n$ as an active material can be lowered to near an average discharge voltage. Therefore, there is no danger that an excess electric current flushes at a time of switching on.

Figure 2:
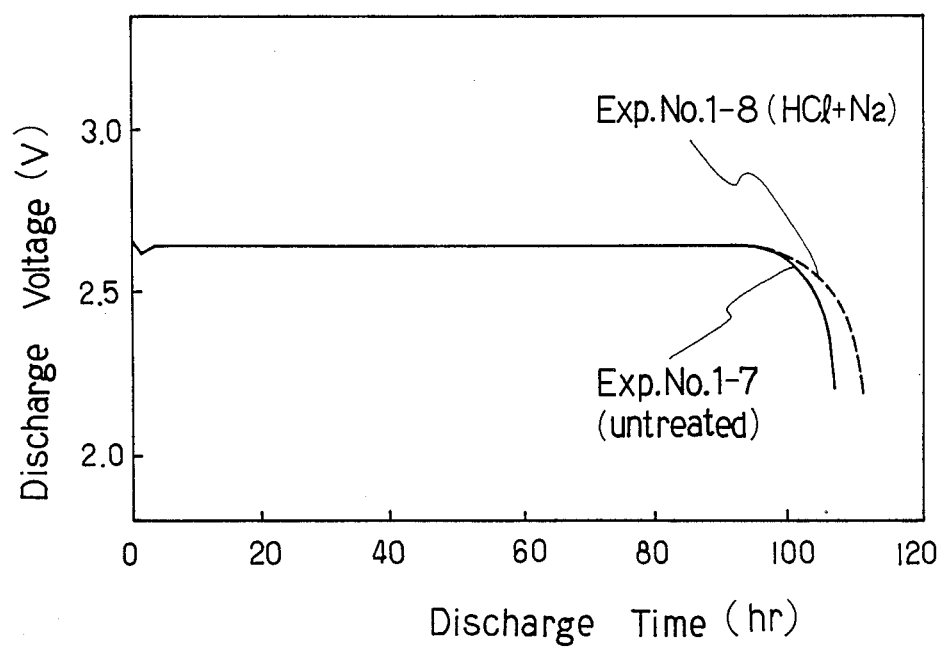

With respect to the $(CF)_n$ as shown in FIG. 2 and Table 4, the discharge time of the battery according to the present invention does scarcely shorten even after storing for one year at 45° C., and is longer by two hours than that of the battery using the untreated carbon fluoride. Such two hours difference of discharge time is in case of continuous discharge, and the difference becomes larger in case of plactical use where a battery repeatedly switches on and off. Such stability of shelf life can be observed with respect to the $(C_2F)_n$.

According to the purification method of the present invention, a non-bonding fluorine content in carbon fluorides can be delicately controlled by contacting with a cheap and safe gas at a relatively low temperature.

What we claim is:

1. A method for removing non-bonding fluorine from carbon fluorides by subjecting the carbon fluorides to contact treatment with gaseous materials which is a gas selected from the group consisting of hydrochloride gas, sulfur dioxide gas, nitrogen dioxide gas, hydrogen gas, steam and a mixed gas thereof.

2. The method of claim 1, wherein the gaseous material contains an inert gas as a carrier gas.

3. The method of claim 2, wherein the inert gas is selected from the group consisting of helium gas, argon gas, nitrogen gas and air.

4. The method of claim 1, wherein the treatment is carried out at a temperature of room temperature to 100° C.

* * * * *